United States Patent
Ford et al.

(10) Patent No.: US 9,109,108 B1
(45) Date of Patent: Aug. 18, 2015

(54) LVT FLOORING AND UNDERLAYMENT INCLUDING EXTRUDED SHEET MATERIAL WITH EXPANDED MICROSPHERES

(71) Applicants: Richard Ford, Braselton, GA (US); Richard Allgood, Lawrenceville, GA (US)

(72) Inventors: Richard Ford, Braselton, GA (US); Richard Allgood, Lawrenceville, GA (US)

(73) Assignee: Pak-Lite, Inc., Suwanee, GA (US)

( * ) Notice: Subject to any disclaimer, the term of this patent is extended or adjusted under 35 U.S.C. 154(b) by 0 days.

(21) Appl. No.: 14/728,513

(22) Filed: Jun. 2, 2015

Related U.S. Application Data

(63) Continuation-in-part of application No. 13/965,885, filed on Aug. 13, 2013.

(51) Int. Cl.
| | |
|---|---|
| E04C 1/00 | (2006.01) |
| E04C 2/20 | (2006.01) |
| E04F 15/02 | (2006.01) |
| C08L 31/04 | (2006.01) |
| E04F 15/20 | (2006.01) |
| C08L 23/06 | (2006.01) |

(52) U.S. Cl.
CPC .............. *C08L 31/04* (2013.01); *C08L 23/06* (2013.01); *E04F 15/02* (2013.01); *E04F 15/203* (2013.01)

(58) Field of Classification Search
CPC ............ E04B 5/00; E04B 5/043; E04C 2/02; E04C 2/20; E04C 2/205; E04C 2/24; E04F 15/18
USPC ........................... 52/309.1, 309.4, 403.1, 408
See application file for complete search history.

(56) References Cited

U.S. PATENT DOCUMENTS

| | | | | |
|---|---|---|---|---|
| 3,365,315 A | * | 1/1968 | Beck et al. | 501/33 |
| 3,945,956 A | * | 3/1976 | Garner | 521/88 |
| 4,013,810 A | * | 3/1977 | Long | 428/313.9 |
| 4,077,922 A | * | 3/1978 | Farrissey et al. | 523/219 |
| 4,095,008 A | * | 6/1978 | Sundstrom et al. | 428/215 |
| 4,252,910 A | * | 2/1981 | Schaefer | 521/145 |
| 4,303,730 A | * | 12/1981 | Torobin | 428/333 |
| 4,748,790 A | * | 6/1988 | Frangolacci | 52/794.1 |
| 5,333,421 A | * | 8/1994 | McKenna | 52/86 |
| 5,356,958 A | * | 10/1994 | Matthews | 523/219 |
| 5,407,983 A | * | 4/1995 | Naton | 524/113 |
| 5,422,380 A | * | 6/1995 | Mendelsohn et al. | 521/107 |
| 5,888,642 A | * | 3/1999 | Meteer et al. | 428/313.5 |
| 5,960,592 A | * | 10/1999 | Lilienthal et al. | 52/79.1 |
| 6,068,915 A | * | 5/2000 | Harrison et al. | 428/313.5 |
| 6,084,000 A | * | 7/2000 | Weiser et al. | 521/54 |
| 6,103,152 A | * | 8/2000 | Gehlsen et al. | 264/45.4 |
| 6,576,075 B1 | * | 6/2003 | Hartman et al. | 156/78 |
| 6,673,432 B2 | * | 1/2004 | Kiik et al. | 428/301.1 |
| 6,808,776 B2 | * | 10/2004 | Mientus et al. | 428/41.8 |
| 7,001,653 B2 | * | 2/2006 | Chen et al. | 428/36.91 |

(Continued)

*Primary Examiner* — Mark Wendell
*Assistant Examiner* — Keith Minter
(74) *Attorney, Agent, or Firm* — Bryan W. Bockhop; Bockhop & Associates, LLC

(57) ABSTRACT

A hybrid underlayment, includes a thermoplastic making up between 92.0% by volume to 95.5% by volume of the hybrid underlayment. A plurality of expanded microspheres is dispersed through the thermoplastic. The microspheres are expanded to a volume in a range of between 180 square micrometers and 1450 square micrometers. The microspheres makeup between 1.0% by volume to 7.5% by volume of the hybrid underlayment. The hybrid underlayment is extruded into a flat sheet having a thickness of between 1.0 mm and 2.0 mm and a density from 7 pcf to 25 pcf.

20 Claims, 2 Drawing Sheets

(56) References Cited

U.S. PATENT DOCUMENTS

| | | | |
|---|---|---|---|
| 7,037,865 B1* | 5/2006 | Kimberly | 442/181 |
| 7,163,741 B2* | 1/2007 | Khandpur et al. | 428/355 BL |
| 7,956,096 B2* | 6/2011 | Nordin et al. | 521/56 |
| 8,092,858 B2* | 1/2012 | Smith | 427/180 |
| 8,209,927 B2* | 7/2012 | Cottier et al. | 52/309.3 |
| 8,450,225 B2* | 5/2013 | Restuccia et al. | 442/329 |
| 8,512,848 B2* | 8/2013 | Reichwein et al. | 428/156 |
| 8,720,144 B2* | 5/2014 | Keane | 52/403.1 |
| 8,833,028 B2* | 9/2014 | Whispell et al. | 52/588.1 |
| 2003/0157295 A1* | 8/2003 | Burns et al. | 428/95 |
| 2006/0054059 A1* | 3/2006 | Dubey et al. | 106/698 |
| 2006/0070326 A1* | 4/2006 | Collison et al. | 52/403.1 |
| 2006/0216471 A1* | 9/2006 | Grah et al. | 428/137 |
| 2007/0032575 A1* | 2/2007 | Bulluck et al. | 523/219 |
| 2007/0202303 A1* | 8/2007 | Bischoff et al. | 428/195.1 |
| 2008/0035021 A1* | 2/2008 | Sambasivan et al. | 106/286.5 |
| 2008/0057295 A1* | 3/2008 | Laverdure et al. | 428/319.3 |
| 2008/0070019 A1* | 3/2008 | Good et al. | 428/218 |
| 2009/0056261 A1* | 3/2009 | Damgaard | 52/408 |
| 2009/0191780 A1* | 7/2009 | Schiffer et al. | 442/394 |
| 2009/0308001 A1* | 12/2009 | Wu et al. | 52/173.3 |
| 2010/0021718 A1* | 1/2010 | Vos et al. | 428/315.9 |
| 2010/0151220 A1* | 6/2010 | Bowmar et al. | 428/220 |
| 2013/0145707 A1* | 6/2013 | Pervan | 52/309.1 |
| 2013/0212968 A1* | 8/2013 | Demmig et al. | 52/309.1 |
| 2015/0174791 A1 | 6/2015 | Dauphin et al. | |

* cited by examiner

LVT FLOORING AND UNDERLAYMENT INCLUDING EXTRUDED SHEET MATERIAL WITH EXPANDED MICROSPHERES

CROSS-REFERENCE TO RELATED APPLICATION(S)

This application is a continuation-in-part of, and claims the benefit of, U.S. patent application Ser. No. 13/965,885, filed Aug. 18, 2018, the entirety of which is hereby incorporated herein by reference.

BACKGROUND OF THE INVENTION

1. Field of the Invention

The present invention relates to flooring systems and, more specifically, to a flooring system for interlocking flooring units.

2. Description of the Related Art

Luxury vinyl tile (LVT) flooring units are increasingly used in high end flooring applications. Such flooring units, while made of vinyl, often have a texture and color corresponding to other flooring materials, such as ceramic tiles and wood. They are frequently (but not always) less expensive than the floorings materials they resemble. They also tend to be lighter and easier to install that other flooring materials and often are more resistant to scuffs and stains.

LVT units typically have complementary locking surfaces on their edges so that adjacent units are locked to each other along their edges. Most installers of LVT units place an underlayment between the subfloor and the flooring units. This underlayment improves the acoustics and feel of the flooring units by absorbing movement between the flooring units and the floor substrate as users walk across the surface of the flooring units.

Typical underlayments tend to be resilient, which allows for dampening of the effects of people walking on the floor. However, because the underlayments do not provide adequate support for the locking surfaces of the flooring units, the locking surfaces along the edge of a flooring unit tend to be weaker than the rest of the flooring unit. Therefore, when one's heel, or other pressure source, is applied to the locking joint between two flooring units, the locking surfaces become weakened due to the resilience of the underlayment. Through enough use, the locking surfaces can become degraded and even break.

Therefore, there is a need for a flooring system with an underlayment that reduces stress on the locking surfaces of LVT flooring units while providing adequate sound dampening.

SUMMARY OF THE INVENTION

The disadvantages of the prior art are overcome by the present invention which, in one aspect, is a flooring for covering a floor substrate that includes a hybrid underlayment and a plurality of interfacing LVT flooring units. The hybrid underlayment is disposed on the floor substrate. The hybrid underlayment includes an extruded thermoplastic sheet having a plurality of gas-filled expanded thermoplastic microspheres distributed throughout the thermoplastic sheet. Each of the plurality of interfacing LVT flooring units is disposed on the hybrid underlayment.

In another aspect, the invention is a floor, which includes a substrate. A hybrid underlayment is coupled to the floor substrate with a first adhesive layer. The hybrid underlayment includes an extruded sheet that includes thermoplastic and a plurality of gas-filled expanded thermoplastic microspheres having a pre-expansion particle size within a range of 28 μm to 38 μm and distributed throughout the thermoplastic. A plurality of LVT units, each of which is coupled to the hybrid underlayment by a second adhesive layer.

In yet another aspect, the invention is a method of installing a floor on a floor substrate, in which a first adhesive layer is applied to the floor substrate. A hybrid underlayment is placed on the first adhesive layer. The hybrid underlayment includes an extruded thermoplastic sheet having a plurality of gas-filled expanded thermoplastic microspheres distributed therein. A second adhesive layer is applied to the hybrid underlayment. A plurality of interfacing LVT flooring units is placed on the second adhesive layer.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
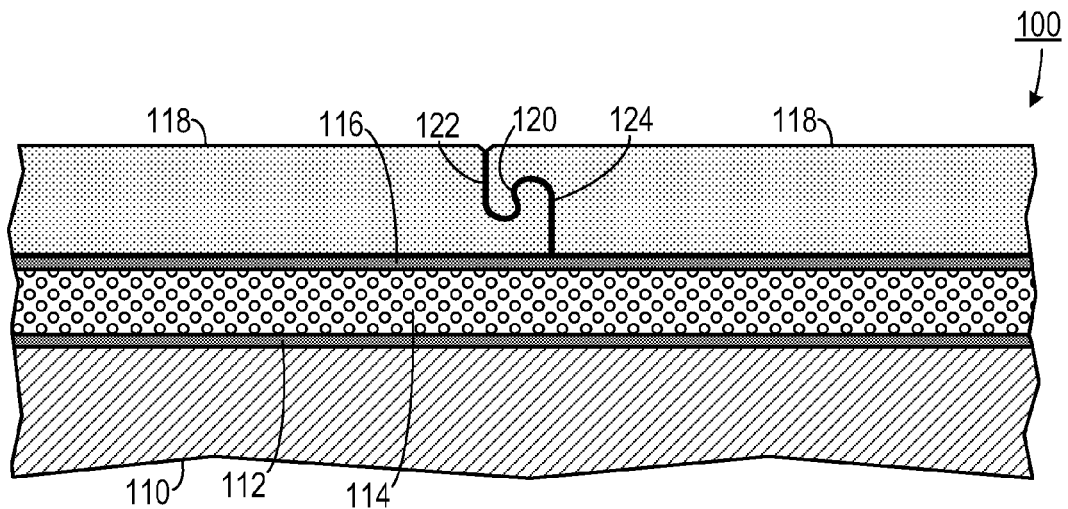
FIG. 1 is a schematic drawing of one embodiment of a flooring system that employs an adhesive.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Also, as used herein, luxury vinyl tile (LVT) units mean flooring units that both meet the ASTM F1700 standard for Solid Vinyl Floor Tile and include printing (including three dimensional printing) thereon that causes the LVT units to resemble ceramic tile, stone, terrazzo or wood.

As shown in FIG. 1, one embodiment of a flooring system 100 includes a flooring substrate 110, which can be a plywood subfloor. A first adhesive layer 112 is disposed on the substrate 110 and a hybrid underlayment 114 is disposed on the first adhesive layer 112 so that the hybrid underlayment 114 is coupled to the substrate 110. A second adhesive layer 116 is disposed on the hybrid underlayment 114 and a plurality of interlocking LVT units 118 is secured to the hybrid underlayment 114 with the second adhesive layer 116. Typically, the flooring units 118 interface each other along a joint 120, which could be as simple as a butt-joint. In one embodiment, the flooring units 118 have complimentary-shaped locking edges 122 and 124 that allow for the interlocking of adjacent flooring units at a joint 120.

The hybrid underlayment 114 includes a thermoplastic sheet in which a plurality of gas-filled expanded thermoplastic microspheres distributed throughout the thermoplastic sheet. In one embodiment, the thermoplastic is polyethylene (which could be either HDPE or LDPE and a plasticizer such as ethylene vinyl acetate (EVA), depending on the specific application). In other embodiments, the thermoplastic can include such plastics as: polypropylene, acrylonitrile butadiene styrene, ethylene-vinyl acetate, polystyrene, poly vinyl chloride, thermoplastic polyolefin, polyethylene terephthalate, polyvinyl fluoride and combinations thereof.

In one embodiment, the microspheres have a pre-expansion particle size within a range of 28 µm to 38 µm and expand when heated to a temperature of about 200° C. In one method of making the underlayment, microsphere pellets are combined with thermoplastic and the combination is heated to about 200° C., during which time the microspheres expand and the combination is then extruded in sheet form to the desired thickness through an extruder.

In one embodiment, Matrix 318 thermoplastic copolymer formulation, available from Matrix Polymers Inc. of Cold Spring Harbor, N.Y., which is a proprietary combination of LDPE and EVA, is used and Expancel® 930-MB-120 microspheres available from Expancel Inc., AkzoNobel of Duluth, Ga. are used. The amount of thermoplastic used is in a range of between 92.0% by volume to 95.5% by volume and the amount of pre-expanded microspheres used is in a range of 1.0% by volume to 7.5% by volume, with any remaining amount being a pigment used to impart color to the resulting sheet material. The combination of thermoplastic and microspheres is heated to a temperature of at least 200° C. so that the microspheres expand to an average size of about 600-700 square micrometers in a range of between 180 square micrometers and 1450 square micrometers. The material is extruded through an extruder so as to have a width in a range of 1.0 mm to 2.0 mm with density in a range of 7 pcf (pounds per cubic foot) to 25 pcf.

In one specific embodiment, the extruded sheet has a thickness of 1.0 mm and a density of 25 pcf. This embodiment uses 93.5% thermoplastic, 3.5% microspheres (prior to expansion of the microspheres) and 3.0% pigment. In another specific embodiment, the extruded sheet has a thickness of 1.5 mm and a density of 19 pcf. This embodiment uses 92.0% thermoplastic, 5.0% microspheres (prior to expansion of the microspheres) and 3.0% pigment.

It has been found that the hybrid underlayment 114 provides good support to the joints 120 between adjacent LVT flooring units 118, thereby reducing stress at the locking surfaces 122 and 124, while also providing good sound dampening. This can result in less wear on the locking surfaces 122 and 124 and an extended lifespan for the LVT flooring units 118. The sound dampening characteristic of the underlayment 114 reduces annoying "clicking" sounds heard by inhabitants of the floor underneath the floor on which the underlayment 114 is used.

Figure 2:
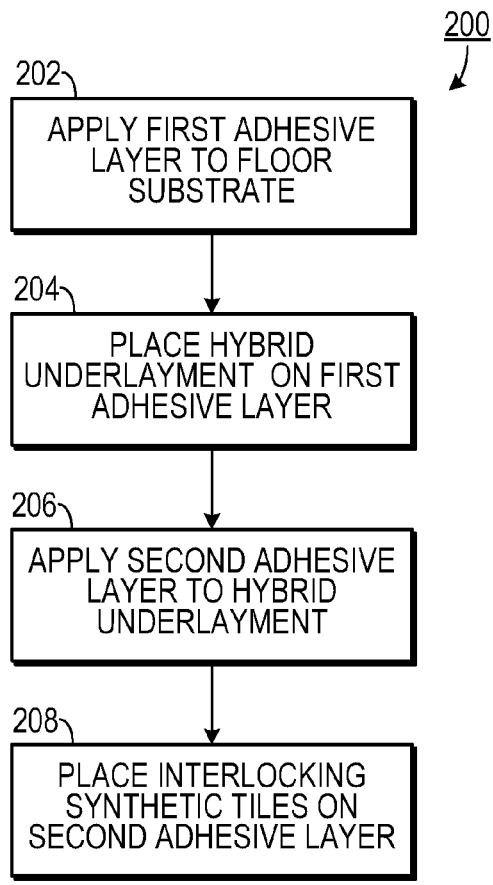
FIG. 2 is a flow chart showing one embodiment of a method of installing a floor.

As shown in FIG. 2, in one method 200 of installing a floor on a floor substrate, a first adhesive layer is applied to the floor substrate 202. A hybrid underlayment is placed on the first adhesive layer 204. The hybrid underlayment includes an extruded thermoplastic sheet having a plurality of gas-filled expanded thermoplastic microspheres distributed therein. A second adhesive layer is applied to the hybrid underlayment 206. A plurality of interlocking synthetic LVT flooring units is placed on the second adhesive layer 208.

Figure 3:
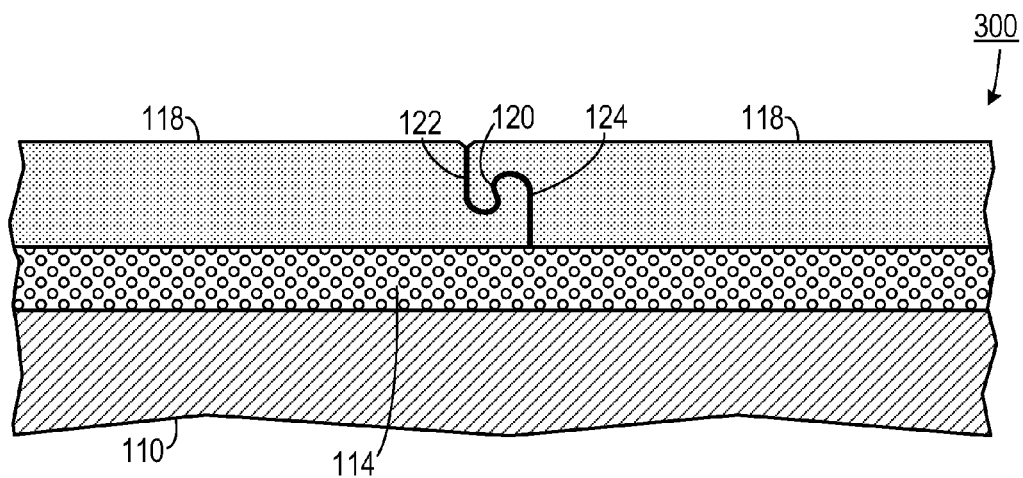
FIG. 3 is a schematic drawing of one embodiment of a flooring system that does not employ adhesive.

As shown in FIG. 3, in one embodiment of a flooring system 300, the hybrid underlayment 114 is placed directly on the substrate 110 and the LVT flooring units 118 are placed directly on the hybrid underlayment 114, without being secured by adhesive.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A hybrid underlayment, comprising:
    (a) a thermoplastic making up between 92.0% by volume to 95.5% by volume of the hybrid underlayment; and
    (b) a plurality of expanded microspheres dispersed through the thermoplastic, the microspheres expanded to a volume in a range of between 180 square micrometers and 1450 square micrometers, the microspheres making up between 1.0% by volume to 7.5% by volume of the hybrid underlayment prior to expansion of the microspheres,
    wherein the thermoplastic and the microspheres form an extruded flat sheet having a thickness of between 1.0 mm and 2.0 mm and a density from 7 pcf to 25 pcf.

2. The hybrid underlayment of claim 1, wherein the thermoplastic comprises a combination of LDPE and EVA.

3. The hybrid underlayment of claim 1, wherein the expanded microspheres have an average size between 600-700 square micrometers.

4. The hybrid underlayment of claim 1, wherein the expanded microspheres have a pre-expansion particle size within a range of 28 µm to 38 µm.

5. The hybrid underlayment of claim 1, wherein the hybrid underlayment has a thickness of 1.0 mm and a density of 25 pcf.

6. The hybrid underlayment of claim 5, comprising 93.5% thermoplastic, 3.5% microspheres and 3.0% pigment.

7. The hybrid underlayment of claim 1, wherein the hybrid underlayment has a thickness 1.5 mm and a density of 19 pcf.

8. The hybrid underlayment of claim 7, comprising 92.0% thermoplastic, 5.0% microspheres and 3.0% pigment.

9. A flooring for covering a floor substrate, comprising:
    (a) a hybrid underlayment that disposed on the floor substrate, the hybrid underlayment including:
        (i) a thermoplastic making up between 92.0% by volume to 95.5% by volume of the hybrid underlayment; and
        (ii) a plurality of expanded microspheres dispersed through the thermoplastic, the microspheres expanded to a volume in a range of between 180 square micrometers and 1450 square micrometers, the microspheres making up between 1.0% by volume to 7.5% by volume of the hybrid underlayment prior to expansion of the microspheres,
        wherein the thermoplastic and the microspheres form an extruded flat sheet having a thickness of between 1.0 mm and 2.0 mm and a density from 7 pcf to 25 pcf; and
    (b) a plurality of interfacing LVT flooring units, each of which is disposed on the hybrid underlayment.

10. The flooring claim 9, wherein the thermoplastic comprises a combination of LDPE and EVA.

11. The flooring claim 9, wherein the expanded microspheres have an average size between 600-700 square micrometers.

12. The flooring claim 9, wherein the expanded microspheres have a pre-expansion particle size within a range of 28 µm to 38 µm.

13. The flooring claim 9, wherein the hybrid underlayment has a thickness of 1.0 mm and a density of 25 pcf.

14. The flooring claim 13, comprising 93.5% thermoplastic, 3.5% microspheres and 3.0% pigment.

15. The flooring claim 9, wherein the hybrid underlayment has a thickness 1.5 mm and a density of 19 pcf.

16. The flooring of claim 15, comprising 92.0% thermoplastic, 5.0% microspheres and 3.0% pigment.

17. A floor, comprising:
(a) a substrate;
(b) a hybrid underlayment that disposed on the floor substrate, the hybrid underlayment including:
  (i) a thermoplastic making up between 92.0% by volume to 95.5% by volume of the hybrid underlayment; and
  (ii) a plurality of expanded microspheres dispersed through the thermoplastic, the microspheres expanded to a volume in a range of between 180 square micrometers and 1450 square micrometers, the microspheres making up between 1.0% by volume to 7.5% by volume of the hybrid underlayment prior to expansion of the microspheres,
wherein the thermoplastic and the microspheres form an extruded flat sheet having a thickness of between 1.0 mm and 2.0 mm and a density from 7 pcf to 25 pcf; and
(c) a plurality of interfacing LVT flooring units, each of which is disposed on the hybrid underlayment.

18. The floor of claim 17, wherein the hybrid underlayment has a thickness of 1.0 mm and a density of 25 pcf and wherein the hybrid underlayment includes 93.5% thermoplastic, 3.5% microspheres and 3.0% pigment.

19. The floor of claim 17, wherein the hybrid underlayment has a thickness 1.5 mm and a density of 19 pcf and wherein the hybrid underlayment includes 92.0% thermoplastic, 5.0% microspheres and 3.0% pigment.

20. The floor of claim 17, wherein the expanded microspheres have an average size between 600-700 square micrometers.

\* \* \* \* \*